United States Patent [19]
Wigren et al.

[11] Patent Number: 5,596,678
[45] Date of Patent: Jan. 21, 1997

[54] LOST FRAME CONCEALMENT

[75] Inventors: Karl T. Wigren, Upsala; Rolf A. Bergström, Mölndal, both of Sweden

[73] Assignee: Telefonaktiebolaget LM Ericsson, Stockholm, Sweden

[21] Appl. No.: 258,577

[22] Filed: Jun. 10, 1994

[30] Foreign Application Priority Data

Jun. 11, 1993 [SE] Sweden .................................. 9302025
Dec. 6, 1993 [SE] Sweden .................................. 9304058

[51] Int. Cl.$^6$ .................................................. H04B 1/10
[52] U.S. Cl. ........................ 395/237; 395/2.42; 395/2.55; 371/65
[58] Field of Search ................................. 395/2.37, 2.42, 395/2.55, 2.33, 2.74; 381/46; 371/65, 31

[56] References Cited

U.S. PATENT DOCUMENTS

| | | | |
|---|---|---|---|
| 4,281,218 | 7/1981 | Chuang et al. | 370/81 |
| 4,357,491 | 11/1982 | Daaboul et al. | 395/2.42 |
| 5,097,507 | 3/1992 | Zinser et al. | 395/2.35 |

FOREIGN PATENT DOCUMENTS 0522213  9/1993  European Pat. Off.

OTHER PUBLICATIONS

L. R. Rabiner, "Applications of Voice Processing to Telecommunications", Proc. IEEE, vol. 82, No. 2, pp. 199–228.
International Publication No. WO 89/08910.
J. G. Proakis, "Digital Communication", 2nd Ed, McGraw–Hill, 1989 pp. 220–234, 362–365, and 593–624.
G. C. Clark et al., "Error Correction Coding for Digital Communication", Plenum Press 1981, pp. 1–17, 49–53, 73–75 and 227–235.
T. B. Minde et al., "Techniques for Low Bit Rate Speech Coding Using Long Analysis Frames", ICASSP, Minneapolis, USA, 1993.
B. S. Atal et al., "Advances in Speech Coding", Kluwer Academic Publishers, 1991 pp. 69–79.
"Voice Activity Detection", Recommendation GSM 06.32, ETSI/GSM, 1991.
Bryden, Seguin, Conan, Bhargava, and Brind'Amour, "Error Correction/Masking for Digital Voice Transmission Over the Land Mobile Satellite System", IEEE Transactions on Communications, vol. 37, p. 312 Mar. 1989.

Primary Examiner—David D. Knepper
Assistant Examiner—Tálivaldis Ivars Smits
Attorney, Agent, or Firm—Burns, Doane, Swecker & Mathis, L.L.P.

[57] ABSTRACT

A receiver in a frame based radio communication system includes a speech decoder of the source-filter type which is controlled by internal state variables updated on a frame by frame basis for modifying received filter defining parameters representing background sounds transmitted over a communication channel. The receiver detects frame loss and conceals the effects of frame loss by restricting updating of at least one of the internal state variables.

20 Claims, 1 Drawing Sheet

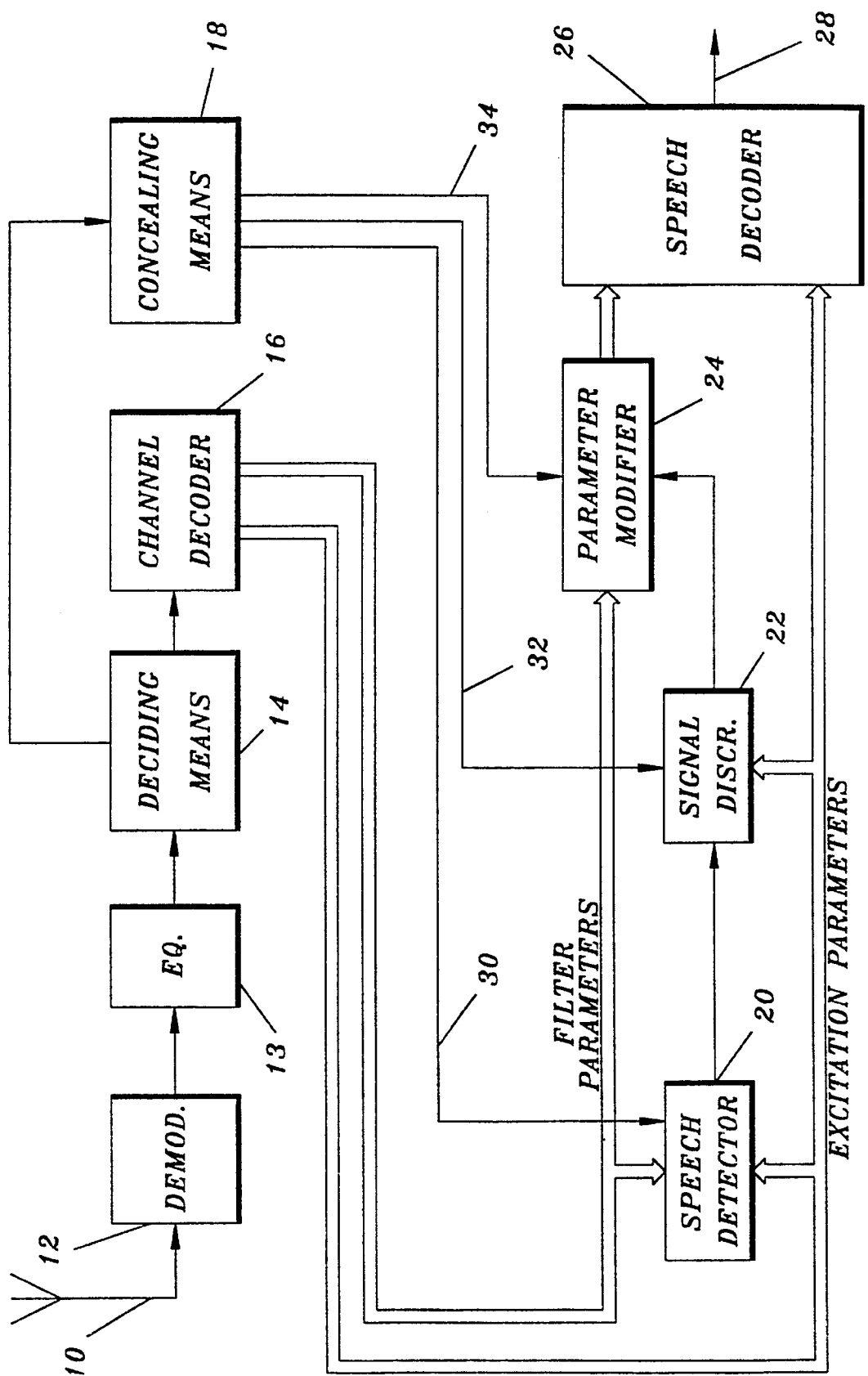

LOST FRAME CONCEALMENT

TECHNICAL FIELD

The present invention relates to lost frame concealment in a communication system, for example a radio communication system, and specifically to an apparatus and a method for improving decoding of background sounds in such a system.

BACKGROUND OF THE INVENTION

Means for improving encoding/decoding of background sounds, primarily intended for digital cellular telephone systems, have been described in Swedish Patent Applications 93 00290-5 and 93 01798-6. These means are primarily designed to handle a situation where the connection between the speech encoder and the speech decoder is close to ideal, in the sense that no frames are lost. However, in for example the American digital cellular standard IS-54 the Fast Associated Control CHannel (FACCH) is established by stealing speech frames from the traffic channel (a similar channel exists in the European GSM specification). In such a case it may be necessary to modify the methods described in the above Swedish patent applications. A similar situation arises in a packet switched network when packets (frames) are lost or arrive too late to be used for speech generation in real time (the packets may take different routes between sender and receiver).

An object of the present invention is an apparatus and a method in which so called lost frame concealment is applied to the received signal in order to make the speech decoding more robust or insensitive to lost frames.

SUMMARY OF THE INVENTION

In accordance with the invention this object is solved by an apparatus in a receiver in a frame based communication system, for concealing the effects of lost frames in a speech decoder, which speech decoder is of the source-filter type and is controlled by means including internal state variables updated on a frame by frame basis for modifying received filter defining parameters representing background sounds, said apparatus comprising:

(a) means for detecting loss of frames;
(b) means for concealing the effects of a lost frame by restricting updating of at least one of said internal state variables.

Furthermore, in accordance with the invention the above object is also solved by a method in a receiver in a frame based radio communication system, for concealing the effects of lost frames in a speech decoder, which speech decoder is of the source-filter type and comprises means including internal state variables updated on a frame by frame basis for modifying received filter defining parameters representing background sounds, said method comprising:

(a) detecting loss of frames,
(b) concealing the effects of a lost frame by restricting updating of at least one of said internal state variables.

Swedish patent application 9302025-3 describes a similar approach for transmission error concealment.

BRIEF DESCRIPTION OF THE DRAWING

The invention, together with further objects and advantages thereof, may best be understood by making reference to the following description taken together with the accompanying drawing, which is a schematic block diagram of the relevant parts of a receiver in a radio communication system containing an apparatus in accordance with the present invention.

DETAILED DESCRIPTION OF THE PREFERRED EMBODIMENTS

To understand the operation of the invention it is useful to briefly review the operation of a typical digital cellular radio connection, typical lost frame concealment techniques, and also to review the algorithms of the above mentioned Swedish patent applications.

In a communication link of a digital cellular telephone system the acoustic signal is first digitized and then a speech coding algorithm is applied (see for example B. S. Atal, V. Cuperman and A. Gersho, eds, "Advances in Speech Coding", Kluwer Academic Publishers, 1991). This algorithm compresses the speech signal and transforms it to a number of quantized parameters (usually in a frame based manner). The resulting bits are thereafter protected by addition of coding redundancy, using channel encoding techniques (see for example G. C. Clark and J. B. Cain, "Error Correction Coding for Digital Communication", Plenum Press, 1981). The resulting bit stream is then modulated (see for example J. G. Proakis, "Digital Communication", 2nd edition, McGraw-Hill, 1989) and transmitted, for example using TDMA (Time Division Multiple Access) techniques. At the receiver the signal is demodulated. Possible time or multipath dispersion can be countered by various equalization techniques, for example Viterbi equalization or decision feedback equalization (see for example the reference by J. G. Proakis above). Channel decoding (see for example the reference by G. C. Clark and J. B. Cain above) is then used in order to decode the bits that form the quantized parameters that the speech decoder needs in order to reconstruct the transmitted speech signal. It is clear from the above discussion that lost frames can affect the reconstructed speech signal, thus reducing the quality of that signal.

In for example the American digital cellular system in accordance with the standard IS-54 a stolen frame for FACCH would result in a lost speech frame at the speech decoder in the receiver. The speech decoder solves this problem by "filling in" suitable information. Usually the corresponding information from the previous frame is used instead of the lost frame. However, if the decoder provides so called anti-swirling actions for background sounds, which actions will be further described below, the quality of the resulting audio signal would be unacceptable if this method were used.

With this background information in mind, the present invention will now be described with reference to FIG. 1. FIG. 1 shows the parts of a receiver in a mobile radio communication system necessary to describe the present invention. An antenna 10 receives the transmitted signal and forwards it to a demodulator 12. Demodulator 12 demodulates the received signal and forwards it to an equalizer 13, for example a Viterbi-equalizer, which converts the received and demodulated signal into one or several bit streams, which are forwarded to a decision means 14. Decision means 14 determines whether a received frame contains bits from a traffic channel or the fast associated control channel (FACCH). A suitable decision means is described in Swedish patent 9102611-2, which is hereby incorporated by reference. If the received frame contains bits from a traffic channel the bit stream is forwarded to a channel decoder 16.

Channel decoder 16 converts the bit stream into a filter parameter stream and an excitation parameter stream for speech decoding. On the other hand, if the received frame contains bits from FACCH, the bit stream is not forwarded to channel decoder 16. Instead a concealing means 18 is informed of the fact that the present frame does not contain speech data.

The receiver also contains a speech detector 20 (also called voice activity detector or VAD). A suitable speech detector is described in WO 89/08910 by British Telecom PLC. Speech detector 20 determines from said filter and excitation parameters whether the received frame contains primarily speech or background sounds. The decision of speech detector 20 may be forwarded to an optional signal discriminator 22, which uses some of the excitation parameters to determine whether received signals representing background sounds are stationary or not. If a frame is declared as containing stationary background sounds, the output of signal discriminator 22 controls a parameter modifier 24 to modify the received filter parameters. This modification is described in detail in Swedish Patent Application 93 00290-5, which is hereby incorporated by reference. Furthermore, the stationarity detection of signal discriminator 22 and the interaction between speech detector 20, signal discriminator 22 and parameter modifier 24 is described in detail in Swedish Patent Application 93 01798-6 and 93 03613-5, which are hereby incorporated by reference. The possibly modified filter parameters (if the received signal represents stationary background sounds) and the excitation parameters are forwarded to a speech decoder 26, which outputs an audio signal on output line 28.

In order to describe the error concealment techniques of the present invention it is necessary to briefly describe the effect of lost frames (which occurs when FACCH frames replace speech frames) on the so called anti-swirling algorithms that are described in the above two Swedish patent applications. These effects can be divided roughly as follows:

1. Voice activity or speech detector 20 that is used to control the anti-swirling algorithm is usually adaptive ("Voice Activity Detection", Recommendation GSM 06.32, ETSI/GSM, 1991; WO 89/08910 by British Telecom PLC). This means that there are thresholds and corresponding states that are automatically updated internally in the voice activity detector, using either a measured speech signal or, when applied in the receiver as is assumed here, decoded parameters from the channel decoder. When there are lost frames the required parameters have to be generated in the receiver. One way of handling this situation is to use the same parameters as in the previous frame. However, this leads to thresholds or internal state variables that are not updated correctly, which may result in erroneous decisions. The result would be a reduced quality of the reconstructed audio signal.

2. Voice activity or speech detector 20 forms its speech/background sound decision using incoming filter and excitation parameters and also internally updated states, i.e. old incoming parameters and additional a priori information. Lost frames may therefore result in immediate erroneous decisions in the receiver, which leads to reduced quality of the reconstructed audio signal. Furthermore, since the current decision also depends on old incoming parameters, lost frames may also influence future decisions.

3. Signal discriminator 22, which may be a part of the system in a preferred embodiment of the present invention, investigates incoming statistical moments, preferably energy values that describe the average signal energy for each frame. It needs to store a large number of these energies, both for the current frame and for older frames in one or several buffers (details are described in the above Swedish Patent Application 93 01798-6). Should there be errors in these incoming energies, these errors will also be stored in the buffers causing erroneous decisions for a significant amount of time. The result would be a reduced quality of reconstructed background sound signals.

4. The actions that are used in order to counter swirling in case of a stationary background sound signal suffer in several ways when an erroneous decision caused by lost frames occurs. One effect is that speech is destroyed when a stationary background sound is erroneously detected and the anti-swirling actions are initiated. The opposite erroneous decision (speech when there is actually a stationary background sound present) can also occur, and therefore the character of the background sound is changed momentarily, which can be rather annoying. Repeated switching between decisions indicating speech/stationary background sounds is also undesirable, since time constants are in effect during the transition between the two states. Should excessive switching take place this would be very disturbing.

5. The actual anti-swirling actions in parameter modifier 24 (essentially spectral low pass filtering in combination with bandwidth expansion, as explained in detail in the above Swedish Patent Application 93 00290-5) suffer from lost frames. One effect occurs because of erroneous decisions from speech or voice activity detector 20 or from signal discriminator 22. In these cases the updating of the low pass filter may be initiated or turned off, causing a deviation as compared to the case where no frames have been lost. Another effect occurs due to lost frames affecting the spectral information that feeds the low pass filters and the bandwidth expansion. Both these effects may cause quality reductions.

6. A postfilter of speech decoder 26 (whenever present) has similar problems as described in section 5, above. Furthermore, the so called spectral tilt is perceptually very sensitive, and since it may be manipulated by the anti-swirling algorithm, lost frames can give a significant quality reduction of the reconstructed speech signal.

7. The effects described above may combine and influence each other. For example an erroneous decision in speech detector 20 may result in stopped updating of buffers of signal discriminator 22. This in turn will influence signal discriminator 22 for a significant period of time, causing reduced quality of the anti-swirling actions.

From the above discussion it is clear that lost frames can result in incorrect updating of internal variables of speech detector 20, signal discriminator 22, parameter modifier 24 or combinations thereof. In accordance with the present invention these problems are reduced or eliminated by modifying the updating process when frame loss has been detected. This modified updating will now be described more in detail.

When a lost frame has been detected concealing means 18 can control the operation of the updating process of corresponding internal state variables in speech detector 20, signal discriminator 22 and parameter modifier 24, as indicated by control lines 30, 32 and 34, respectively. These modifications include:

Stopping updating of internal state variables (for example thresholds) of speech detector 20 when frame loss is detected. This implies that the internal variables of speech detector 20 are locked to the same value as in the previous frame, or that the updating of these state variables is restricted (state variables can only be updated by smaller amounts than usual).

Another action is to lock the decision in speech detector 20 to the decision from the previous frame in case frame loss is detected.

If frame loss has been detected the updating of the buffers in signal discriminator 22 can be stopped or restricted.

Another possibility is to lock the decision of signal discriminator 22 to the decision of the previous frame.

If frame loss has been detected the updating of internal filter coefficients of parameter modifier 24 controlling low pass filtering and/or bandwidth expansion can be stopped or restricted.

The spectral tilt of a possible post filter can be locked to the tilt of the previous frame.

Since different parameters influence different blocks in the drawing (speech detector 20, signal discriminator 22, parameter modifier 24 and a possible postfilter), it is appreciated that one or several of these actions can be taken in case of frame loss.

In the above discussion it is also appreciated that if frame loss persists for several consecutive frames, internal state variables of the receiver will be locked to (or essentially locked to) values corresponding to the latest received frame.

The invention has been described with reference to a frame based radio communication system, in which frames are sometimes "stolen" from the traffic channel to be used for other purposes. However, the same principles can also be applied to situations in which frames are lost for other reasons, for example in a packet switched network, where packets (these can either be considered entire frames or as parts of a frame) use different routes from transmitter to receiver and may be "lost" due to late arrival or actual loss of packets during transfer.

A preferred embodiment of the method in accordance with the present invention is illustrated in detail by the two PASCAL program modules in the attached APPENDIX.

It will be understood by those skilled in the art that various modifications and changes may be made to the present invention without departure from the spirit and scope thereof, which is defined by the appended claims.

APPENDIX

```
[INHERIT ('spd$def')]
MODULE vad_dtx_rx (input,output);

CONST nr_sub_blocks    =    4;
        nr_acf_lags_in   =   10;
        nr_acf_lags_used =    8;
        burstconst       =    3;
        hangconst        =    5;
        frames_av0       =    4;

VAR adaptcount       : [STATIC] INTEGER;   { For threshold }
        thvad            : [STATIC] DOUBLE;    { For threshold }
        rvad             : [STATIC] ARRAY [0..nr_acf_lags_used]
                                    OF REAL;
        burstcount       : [STATIC] INTEGER;   { For overhang }
        hangcount        : [STATIC] INTEGER;   { For overhang }
        n                : [STATIC] ARRAY [-1..nr_sub_blocks-1]
                                    OF INTEGER;
        last_dm          : [STATIC] REAL;      { For VAD }
        old_lag_count    : [STATIC] INTEGER;
        very_old_lag_count : [STATIC] INTEGER;
        thresh           : [STATIC] REAL;
        lthresh          : [STATIC] INTEGER;
        nthresh          : [STATIC] INTEGER;

acf_old,av0      : [STATIC] ARRAY [-frames_av0..0,
                                           0..nr_acf_lags_used]
                                    OF REAL;
        aav1,rav1,av1    : [STATIC] ARRAY [0..nr_acf_lags_used]
                                    OF REAL;

elapsed_frames   : [STATIC] INTEGER;
```

```
                                11
    sp_hangover        : [STATIC] INTEGER;
    speech_dtx         : [STATIC] BOOLEAN;

sp_old             : [STATIC] BOOLEAN;

PROCEDURE schur_pas ( acf : ARRAY [A1..A2:INTEGER] OF REAL;
                      VAR rc : ARRAY [B1..B2: INTEGER] OF
                                 REAL;
                      mdim   : INTEGER ); EXTERNAL;

PROCEDURE stepup_pas ( rc   : ARRAY [A1..A2:INTEGER] OF REAL;
                       VAR a : ARRAY [B1..B2:INTEGER] OF
                                 REAL;
                       mdim  : INTEGER ); EXTERNAL;

PROCEDURE Flstat_det_rx ( pow    : REAL;
                          sp_1 : BOOLEAN;
                          VAR sp : BOOLEAN); EXTERNAL;

PROCEDURE Flstat_det_rx_init; EXTERNAL;

[GLOBAL]
PROCEDURE FLvad_init;            { MUST be called from start}

VAR
        i,j    : INTEGER;

BEGIN

{ threshold } adaptcount := 0;
    thvad := 1000000;
    rvad[0] := 6;
    rvad[1] := -4;
    rvad[2] := 1;
```

```
                              12
    FOR i := 3 TO nr_acf_lags_used DO BEGIN
         rvad[i] := 0;
    END;

{ end threshold }

{ vad } old_lag_count := 0;
    very_old_lag_count := 0;
    n[3] := 19;
    hangcount := -1;
    burstcount := 0;
    last_dm := 0;
    thresh := 0.05;

lthresh := 2;
    nthresh := 4;

FOR i := -frames_av0 TO -1 DO BEGIN
         FOR j := 0 TO nr_acf_lags_used DO BEGIN
              acf_old[i,j] := 0;
              av0[i,j] := 0;
         END;
    END;

{ end vad } elapsed_frames := 24;
    sp_hangover := 0;
    speech_dtx := TRUE;
    sp_old := TRUE;
    Flstat_det_rx_init;
END;    { init_vad_dtx }

PROCEDURE vad_thresh (
                      acf0 : REAL;                        {  Input }
```

13

```
        rav1 : ARRAY [A1..A2: INTEGER]
                     OF REAL;              {  Input  }
        stat : BOOLEAN;                    {  Input  }
        ptch : BOOLEAN;                    {  Input  }
        pvad : DOUBLE                      {  Output }
      );

{ Common variables used:    ( all output )

adaptcount    initially set to         0
      thvad         initially set to   1000000
       rvad         initially set to   rvad[0] :    6
                                       rvad[1] :   -4
                                       rvad[2] :    1
                                       rvad[3-8] :  0  }

CONST pth    =   300000;
      plev   =   800000;
      fac    =        3;
      adp    =        8;
       inc   =       16;
       dec   =       32;
      margin =  80000000;

VAR i     : INTEGER;

BEGIN

IF acf0 < pth  THEN BEGIN
         thvad := plev;
   END ELSE BEGIN
```

```
                          14
         IF NOT (stat AND NOT ptch) THEN BEGIN
              adaptcount := 0;
         END ELSE BEGIN
              adaptcount := adaptcount +1 ;
              IF adaptcount >  adp THEN BEGIN
                   thvad := thvad - thvad / dec;
                   IF thvad < pvad*fac THEN BEGIN
                        thvad := MIN (
                             thvad +thvad/inc,
                             pvad*fac);
                   END;

IF thvad > pvad+margin THEN BEGIN
                        thvad := pvad +  margin;
                   END;

FOR i := 0 TO nr_acf_lags_used DO
                                                BEGIN
                        rvad[i] := ravl[i];
                   END;

adaptcount := adp + 1;
              END;
         END;
     END;
END;    { Procedure }

PROCEDURE FLvad_rx_1 (
              acf_in : realACFType;                { Input }
              ltp_lags : integersubframeltptype;   { Input }
              VAR  vad : BOOLEAN);                 { Output }

{ Common variables used:

n[-1..3]            : ltp_lags  Input/Output
         oldlagcount         :           Input/Output
         veryoldlagcount     :           Input/Output
```

```
                                15
        thvad               : threshold    }

VAR ptch,
        vvad,
        stat                : BOOLEAN;
        lag_count,
        smallag,
        i,j,k               : INTEGER;
        acf0,
        dm,difference       : REAL;
        pvad                : DOUBLE;
        rc                  : ARRAY [1..nr_acf_lags_used]
                              OF REAL;

BEGIN n[-1] := n[3];
    FOR i := 0 TO 3 DO BEGIN
        n[i] := ltp_lags[i];
    END;

FOR i := -frames_av0 TO -1 DO BEGIN
        FOR k := 0 TO nr_acf_lags_used DO BEGIN
            acf_old[i,k] := acf_old[i+1,k];
            av0[i,k] := av0[i+1,k];
        END;
    END;

FOR k := 0 TO nr_acf_lags_used DO BEGIN
        acf_old[0,k] := acf_in[k];
    END;
```

16

```
{ Adaptive filtering and energy computation. } pvad := rvad[0] * acf_old[0,0];
FOR k := 1 TO nr_acf_lags_used DO BEGIN
      pvad := pvad + 2.0 * rvad[k] * acf_old[0,k];
END;

{ ACF averaging }

FOR k := 0 TO nr_acf_lags_used DO BEGIN
      av0[0,k] := 0;
      FOR j := 0 TO frames_av0-1 DO BEGIN
            av0[0,k] := av0[0,k] + acf_old[-j,k];
      END;
      av1[k] := av0[-frames_av0,k];
END;

{ Solve the equations system }
schur_pas (av1,rc,nr_acf_lags_used);
stepup_pas (rc,aav1,nr_acf_lags_used);

FOR i := 0 TO nr_acf_lags_used DO BEGIN
      rav1[i] := 0;
      FOR k := 0 TO nr_acf_lags_used-i DO BEGIN
            rav1[i] := rav1[i] + aav1[k] * aav1[k+i];
      END;
END;

IF av0[0,0] <= 0 THEN BEGIN
      dm := 0;
END ELSE BEGIN
      dm := rav1[0] * av0[0,0];
      FOR i := 1 TO nr_acf_lags_used DO BEGIN
            dm := dm+ 2*rav1[i]*av0[0,i];
      END;
      dm := dm/av0[0,0];
END;
```

17

```
difference := dm - last_dm;
stat := ABS(difference) < thresh;
last_dm := dm;
ptch := ((old_lag_count+very_old_lag_count) >=nthresh );
acf0 := acf_in[0];
vad_thresh (acf0,rav1,stat,ptch,pvad);
vvad := (pvad>thvad);
IF vvad THEN BEGIN
     burstcount := burstcount + 1;
END ELSE BEGIN
     burstcount := 0;
END;

IF burstcount >= burstconst THEN BEGIN
     hangcount := hangconst;
     burstcount := burstconst;
END;

vad := vvad OR (hangcount >= 0);

IF hangcount >= 0 THEN BEGIN
     hangcount := hangcount -1;
END;

lag_count := 0;

FOR j := 0 TO 3 DO BEGIN
     IF n[j] > 19 THEN BEGIN
          smallag := MAX(n[j],n[j-1]) MOD
                     MIN(n[j],n[j-1]);
          IF MIN(smallag,MIN(n[j],n[j-1])-smallag) <
             lthresh THEN BEGIN
               lag_count := lag_count + 1;
          END;
     END;
END;
```

18

```
    very_old_lag_count := old_lag_count;
    old_lag_count := lag_count;

END;

PROCEDURE FLdtx_hand_rx_1 (   vad : BOOLEAN;         { Input }
                          VAR sp : BOOLEAN);         { Output }

BEGIN

IF elapsed_frames < 24 THEN BEGIN
        elapsed_frames := elapsed_frames + 1;
    END;

IF speech_dtx THEN BEGIN

IF vad THEN BEGIN
            sp := TRUE;
        END ELSE BEGIN
            sp_hangover := 1;
            IF elapsed_frames = 23 THEN BEGIN
                elapsed_frames := 22;
            END;
            sp := (elapsed_frames > 23);
            speech_dtx := FALSE;
        END;
    END ELSE BEGIN
        IF vad THEN BEGIN
            sp := TRUE;
            speech_dtx := TRUE;
        END ELSE BEGIN
            IF sp_hangover < 5 THEN BEGIN
                sp_hangover := sp_hangover + 1;
                IF elapsed_frames = 23 THEN BEGIN
```

```
                            19
                    elapsed_frames := 22;
                END;
            END;
            IF sp_hangover > 4 THEN BEGIN
                    elapsed_frames := 0;
                    sp := FALSE;
            END ELSE BEGIN
                    sp := (elapsed_frames > 23);
            END;
        END;
    END;
END;

[GLOBAL]
PROCEDURE FLvad_rx (
        acf_in : realACFType;                     { Input }
        ltp_lags : integersubframeltptype;        { Input }
        FllostFrame : BOOLEAN;                    { Input }
        VAR  sp : BOOLEAN);                       { Output }

VAR
        vad    : BOOLEAN;
        sp1    : BOOLEAN;

BEGIN

IF NOT FllostFrame THEN BEGIN
        FLvad_rx_1 (acf_in,ltp_lags,vad);

FLdtx_hand_rx_1 (vad,sp1);

FLstat_det_rx (acf_in[0],sp1,sp);

IF NOT use_stat_det THEN BEGIN
            sp := sp1;
        END;
        sp_old := sp;
```

```
                                  20
            END ELSE BEGIN
                sp := sp_old;
            END;
        END;
END.

[INHERIT ('spd$def')]
MODULE as_actions_rx (input,output);

{ "Global" (for the module) variables }

VAR
            FLfilter_filter_state   : [STATIC] realArray10Type;
            FLfilter_filter_coeff   : [STATIC] REAL;
            FLfilter_filter_gain    : [STATIC] REAL;
            FLfilter_post_state     : [STATIC] realArray10Type;
            FLfilter_post_coeff     : [STATIC] REAL;
            FLfilter_post_gain      : [STATIC] REAL;
            FLfilter_my_state       : [STATIC] REAL;
            FLfilter_my_coeff       : [STATIC] REAL;
            FLfilter_my_gain        : [STATIC] REAL;

FLexpand_factor         : [STATIC] REAL;
            first_sp                : [STATIC] BOOLEAN;

{ External routines }

PROCEDURE stepdn_unstable_special_pas (
                    a          : realArray10Type;      {  Input  }
               VAR rc          : RealArray10Type;      {  Output }
               VAR unstable    : BOOLEAN);             {  Output }
    EXTERNAL;

PROCEDURE stepdn_special_pas (
                    a          : realArray10Type;      {  Input  }
               VAR rc          : RealArray10Type);     {  Output }
```

```
                              21

EXTERNAL;

PROCEDURE FLpostCoeffCalculation(
            ZFLacfW                : realACFType;
      VAR   ZFLetaCurr             : realArray10Type );
EXTERNAL;

PROCEDURE FLcalculateACF(
            FLalphaCurr    : realArray10Type;
      VAR   FLacfW         : realACFType );
EXTERNAL;

PROCEDURE FLcalculateautocorrfunction(
            FLalphaCurr    : realArray10Type;
      VAR   FLacfW         : realACFType );
EXTERNAL;

[GLOBAL]
PROCEDURE FLas_actions_rx_init;
            { MUST be called first to initilize }
            { some things. }

VAR
            m    : INTEGER;

{ NOTE FLbw_exp is transferred as COMMON }

BEGIN

FOR m := 1 TO nrCoeff DO BEGIN
            FLfilter_filter_state[m] := 0;
            FLfilter_post_state[m] := 0;
      END;

FLfilter_my_state := 0;
      first_sp := TRUE;
```

22

```
{ The following could be placed in ROM }

FLfilter_filter_coeff := EXP(-1.0/(4.0*50.0));
FLfilter_my_coeff := EXP(-1.0/(0.25*50.0));
FLfilter_post_coeff := FLfilter_my_coeff;

FLfilter_filter_gain := 1 - FLfilter_filter_coeff;
FLfilter_post_gain := 1 - FLfilter_post_coeff;
FLfilter_my_gain := 1 - FLfilter_my_coeff;

IF FLbw_exp >= 0 THEN BEGIN
    FLexpand_factor := EXP(-FLpi*FLbw_exp/8000.0);
END ELSE BEGIN
    FLexpand_factor := 1;
END;
{FLexpand_factor := EXP(-FLpi*100.0/8000.0);}
{FLexpand_factor := EXP(-FLpi*400.0/8000.0);} { ### }

{ ### }
WRITELN('FLfilter_filter_coeff:',FLfilter_filter_coeff);
WRITELN('FLfilter_filter_gain: ',FLfilter_filter_gain);
WRITELN('FLfilter_my_coeff: ',FLfilter_my_coeff);
WRITELN('FLfilter_my_gain: ',FLfilter_my_gain);
WRITELN('FLfilter_post_coeff: ',FLfilter_post_coeff);
WRITELN('FLfilter_post_gain: ',FLfilter_post_gain);

WRITELN('FLbw_exp: ',FLbw_exp);
WRITELN('FLexpand_factor: ',FLexpand_factor);
WRITELN('FLv_post: ',FLv_post);

{ ### }

END;

[GLOBAL]
PROCEDURE FLas_actions_rx (
        sp              : BOOLEAN;                      { In   }
```

23

```
            FLa_in          : realArray10Type;      { In    }
            FLrc_in         : realArray10Type;      { In    }
            FllostFrame     : BOOLEAN;              { In    }
    VAR     FLa_pres        : realArray10Type;      { Out   }
    VAR     FLrc_pres       : realArray10Type;      { Out   }
    VAR     FLa_post_pres   : realArray10Type;      { Out   }
    VAR     FLetacurr       : realArray10Type;      { In/Out }
     VAR    FLmy_use        : REAL);                { Out   }

VAR m           : INTEGER;
            FLdum       : REAL;
            FLRC_temp   : realArray10Type;
            unstable    : BOOLEAN;
            FLacfw      : realACFType;
            i_ab        : INTEGER;      { ### }
            eta_temp    : realArray10Type;  { ### }

BEGIN

FOR m := 1 TO nrCoeff DO BEGIN
        FLa_post_pres[m] := FLa_in[m] * FLnyweight[m];
    END;

IF sp THEN BEGIN

{FLfilter_my_state := FLfilter_my_coeff *
                            FLfilter_my_state +
                    FLfilter_my_gain * FLmy;}  { ### }

FLmy_use := FLmy;

FOR m := 1 TO nrCoeff DO BEGIN
            FLa_pres[m] := FLa_in[m];
```

24

```
            FLrc_pres[m] := FLrc_in[m];
    END;

IF first_sp THEN BEGIN
        FLdum := FLexpand_factor;
        FOR m := 1 TO nrCoeff DO BEGIN
            Flfilter_filter_state[m] :=
                FLa_in[m] * FLdum;

FLfilter_post_state[m] :=
                FLa_post_pres[m] * FLdum;

FLdum := FLdum * Flexpand_factor;
        END;
    END;
END ELSE BEGIN

IF NOT FllostFrame THEN BEGIN
        FLfilter_my_state := FLfilter_my_coeff *
                                FLfilter_my_state +
                        FLfilter_my_gain * FLmy_off;
    END;

FLmy_use := FLfilter_my_state;

FLdum := FLexpand_factor;
    FOR m := 1 TO nrCoeff DO BEGIN
        IF NOT FllostFrame THEN BEGIN
            FLfilter_filter_state[m] :=
                FLfilter_filter_state[m] *
                FLfilter_filter_coeff +
                FLfilter_filter_gain *
                FLa_in[m] * FLdum;

FLfilter_post_state[m] :=
                FLfilter_post_state[m] *
                FLfilter_post_coeff +
```

25

```
                    FLfilter_post_gain *
        FLa_post_pres[m] * FLdum;
    END;

FLa_pres[m] :=
       FLfilter_filter_state[m];

FLa_post_pres[m] :=
       FLfilter_post_state[m];

FLdum := FLdum * FLexpand_factor;
END;

{ Check for stability } stepdn_unstable_special_pas (
                              FLa_pres,    {  In  }
                              FLRC_pres,   {  Out }
                              unstable);   {  Out }

IF unstable THEN BEGIN
WRITELN('Unstable a-parameter (as_actions_rx)');
    FOR m := 1 to nrCoeff DO BEGIN
        FLa_pres[m] := FLa_in[m];
        FLrc_pres[m] := FLrc_in[m];
    END;
END;

stepdn_unstable_special_pas (
                              FLa_post_pres, {  In  }
                              FLRC_temp,     {  Out }
                              unstable);     {  Out }

IF unstable THEN BEGIN
WRITELN('Unstable post_filter (as_actions_rx)');
    FLdum := FLexpand_factor;
    FOR m := 1 TO nrCoeff DO BEGIN
```

26

```
                    FLa_post_pres[m] := FLa_in[m] *
                                FLnyweight[m]* Fldum;
                FLdum := FLdum * FLexpand_factor;
            END;
        END;

FLcalculateACF (
                    FLa_post_pres,
                    FLACFw);

{Flcalculateautocorrfunction (
                    FLa_pres,
                    FLACFw);}

FLpostCoeffCalculation (
                    FLACFw,
                    FLetaCurr);

END;

first_sp := (sp AND first_sp);
    END;
END.
```

We claim:

1. An apparatus in a receiver in a frame based communication system, for concealing the effects of lost frames in a speech decoder, said speech decoder is of the source-filter type and is controlled by means including internal state variables updated on a frame by frame basis for modifying received filter defining parameters representing background sounds, said apparatus comprising:

means for detecting loss of frames; and means for concealing the effects of a lost frame by restricting updating of at least one of said internal state variables, wherein said filter parameter modifying means includes a voice activity decoder with at least a threshold for speech/background sound decisions and means for low pass filtering of the filter defining parameters, said concealing means restricting updating of said threshold and updating of filter coefficients of the low pass filtering process in the case of a lost frame.

2. The apparatus according to claim 1, comprising a post filter for modifying a tilt of the spectrum of the decoded signal, said concealing means restricting updating of the tilt information in case of a lost frame.

3. The apparatus according to claim 1, wherein said filter parameter modifying means further includes a stationarity detector connected to an output of said voice activity detector for discriminating between stationary and non-stationary background sounds, said stationarity detector including at least one buffer containing estimates of statistical moments of recent frames dominated by background sounds for making stationarity decisions, said concealing means restricting updating of said buffer in case of a lost frame.

4. The apparatus according to claim 1, wherein said filter parameter modifying means further includes a stationarity detector connected to an output of said voice activity detector for discriminating between stationary and non-stationary background sounds, said concealing means inhibiting updating of the stationary/non-stationary decision obtained from the previous frame in case of a lost frame.

5. An apparatus in a receiver in a frame based communication system, for concealing the effects of lost frames in a speech decoder, said speech decoder is of the source-filter type and is controlled by means including internal state variables updated on a frame by frame basis for modifying received filter defining parameters representing background sounds, said apparatus comprising:

means for detecting loss of frames; and means for concealing the effects of a lost frame by restricting updating of at least one of said internal state variables, wherein said filter parameter modifying means includes a voice activity detector with at least a threshold for speech/background sound decisions and means for bandwidth expansion of the filter represented by the filter defining parameters, said concealing means restricting updating of said threshold and updating of filter coefficients in case of a lost frame.

6. The apparatus according to claim 5, comprising a post filter for modifying a tilt of the spectrum of the decoded signal, said concealing means restricting updating of tilt information in case of a lost frame.

7. A method in a receiver in a frame based radio communication system, for concealing the effects of lost flames in a speech decoder, said speech decoder is of the source-filter type and comprises means including internal state variables updated on a frame by frame basis for modifying received filter defining parameters representing background sounds, said method comprising the steps of:

detecting loss of flames; and concealing the effects of a lost frame by restricting updating of at least one of said internal state variables, wherein said filter parameter modifying means includes a voice activity detector with at least a threshold for speech/background sound decisions and means for low pass filtering of the filter parameters, wherein said concealing step comprises restricting updating of said threshold in case of a lost frame and said method comprises restricting updating of filter coefficients of the low pass filtering process in the case of a lost frame.

8. The method according to claim 7, wherein a tilt of the spectrum of the decoded signal is modified by a post filter, said method comprising restricting updating of tilt information in case of a lost frame.

9. The method according to claim 7, wherein said filter parameter modifying means further including a stationarity detector connected to an output of said voice activity detector for discriminating between stationary and non-stationary background sounds, said stationarity detector including at least one buffer containing estimates of statistical moments of recent frames dominated by background sounds for making stationarity decisions, wherein said concealing step comprises restricting updating of said buffer in case of a lost frame.

10. The method according to claim 7, wherein said filter parameter modifying means further including a stationarity detector connected to an output of said voice activity detector for discriminating between stationary and non-stationary background sounds, wherein said concealing step comprises inhibiting updating of the stationary/non-stationary decision obtained from the previous frame in case of a lost frame.

11. A method in a receiver in a frame based radio communication system, for concealing the effects of lost frames in a speech decoder, said speech decoder is of the source-filter type and comprising means including internal state variables updated on a frame by frame basis for modifying received filter defining parameters representing background sounds, said method comprising the steps of:

detecting lost frames; and concealing the effects of a lost frame by restricting updating of at least one of said internal state variables, wherein said filter parameter modifying means includes a voice activity detector with at least a threshold for speech/background sound decisions and means for bandwidth expansion of the filter represented by these parameters, wherein the concealing step comprises restricting updating of said threshold in case of a lost frame and said method comprises restricting updating of filter coefficients in case of a lost frame.

12. The method according to claim 11, wherein the tilt of the spectrum of the decoded signal is modified by a post filter, said method comprising restricting updating of tilt information in case of a lost frame.

13. An apparatus in a receiver in a frame based radio communication system for concealing the effects of lost frames in a speech decoder said speech decoder being of a source filter type and is controlled by means including internal state variables updated on a frame by frame basis for modifying received filter defining parameters representing background sounds, said apparatus comprising:

means for detecting loss of flames; and means for concealing the effects of a lost frame by restricting updating of at least one of said internal state variables, wherein said filter parameter modifying means includes a voice activity detector for performing speech background sound decisions on a frame by frame basis and means for low pass filtering of the filter defining parameters, said concealing means inhibiting updating of the speech/background sound decision obtained from the previous frame and restricting updating of filter coefficients of the low pass filtering process in case of a lost frame.

14. The apparatus according to claim 13, wherein said filter parameter modifying means further includes a stationarity detector connected to an output of said voice activity detector for discriminating between stationary and non-stationary background sounds, said stationarity detector including at least one buffer containing estimates of statistical moments of recent frames dominated by background sounds for making stationarity decisions, said concealing means restricting updating of said buffer in case of a lost frame.

15. The apparatus according to claim 13, wherein said filter parameter modifying means further includes a stationarity detector connected to an output of said voice activity detector for discriminating between stationary and non-stationary background sounds, said concealing means inhibiting updating of the stationary/non-stationary decision obtained from the previous frame in case of a lost frame.

16. An apparatus in a receiver in a frame based radio communication system for concealing the effects of lost flames in a speech decoder said speech decoder being of a source filter type and is controlled by means including internal state variables updated on a frame by frame basis for modifying received filter defining parameters representing background sounds, said apparatus comprising:

means for detecting loss of flames; and means for concealing the effects of a lost flame by restricting updating of at least one of said internal state variables, wherein the filter parameter modifying means includes a voice activity detector for performing speech background sound decisions on a frame by frame basis and means for bandwidth expansion of the filter represented by the filter defining parameters, said concealing means inhibiting updating of the speech background sound decision obtained from the previous frame and restricting updating of filter coefficients in case of a lost frame.

17. A method in a receiver in a frame based radio communication system, for concealing the effects of lost frames in a speech decoder, said speech decoder is of the source filter type and comprises means including internal state variables updated on a frame by frame basis for modifying received filter defining parameters representing background sounds, said method comprising the steps of:

detecting loss of a frame; and concealing the effects of a lost frame by restricting updating of at least one of said internal state variables, wherein said filter parameter modifying means includes a voice activity detector for performing speech/background sound decisions on a frame by frame basis and means for low pass filtering of said filter parameters, wherein said concealing step comprises inhibiting updating of the speech/background sound decision obtained from the previous frame and restricting updating of filter coefficients of the low pass filtering process in case of a lost frame.

18. The method according to claim 17, said filter modifying means further including a stationarity detector connected to an output of said voice activity detector for discriminating between stationary and non-stationarity background sounds, said stationary detector including at least one buffer containing estimates of statistical moments of recent frames contaminated by background sounds for making stationary decisions, wherein said concealing step comprises restricting updating of said buffer in case of a lost frame.

19. The method according to claim 17, said filter parameter modifying means further including a stationarity detector connected to an output of said voice activity detector for discriminating between stationary and non-stationary background sounds, wherein said concealing step comprises inhibiting updating of the stationary/non-stationary decision obtained from the previous frame in case of a lost frame.

20. A method in a receiver in a frame based radio communication system, for concealing the effects of lost frames in a speech decoder, said speech decoder is of the source filter type and comprises means including internal state variables updated on a frame by frame basis for modifying received filter defining parameters representing background sounds, said method comprising the steps of:

detecting loss of a frame; and concealing the effects of a lost frame by restricting updating of at least one of said internal state variables, wherein said filter parameter modifying means includes a voice activity detector for performing speech/background sound decisions on a frame by frame basis and means for bandwidth expansion of the filter represented by these parameters, wherein said concealing step comprises inhibiting updating of the speech/background sound decision obtained from the previous frame and restricting updating of filter coefficients in case of a lost frame.

* * * * *